US012747009B2

(12) United States Patent
Li et al.

(10) Patent No.: US 12,747,009 B2
(45) Date of Patent: Sep. 29, 2026

(54) UNDERWATER RESCUE DEVICE

(71) Applicant: Binzhou University, Binzhou (CN)

(72) Inventors: Jiaxing Li, Binzhou (CN); Qun Ma, Binzhou (CN); Rongrong Sun, Binzhou (CN); Sen Zhang, Binzhou (CN); Xiaoming Huang, Binzhou (CN); Wentao You, Binzhou (CN); Xiaobing Wang, Binzhou (CN); Yucan Wang, Binzhou (CN); Jinqiang Wang, Binzhou (CN)

( * ) Notice: Subject to any disclaimer, the term of this patent is extended or adjusted under 35 U.S.C. 154(b) by 497 days.

(21) Appl. No.: 18/341,859

(22) Filed: Jun. 27, 2023

(65) Prior Publication Data

US 2023/0356818 A1 Nov. 9, 2023

Related U.S. Application Data

(63) Continuation of application No. PCT/CN2022/104537, filed on Jul. 8, 2022.

(30) Foreign Application Priority Data

May 4, 2022 (CN) ......................... 202210477312.6

(51) Int. Cl.
*B63C 9/00* (2006.01)
*A61H 31/00* (2006.01)
(Continued)

(52) U.S. Cl.
CPC ............. *B63C 9/00* (2013.01); *A61H 31/006* (2013.01); *A61H 31/008* (2013.01); *B60F 5/02* (2013.01);
(Continued)

(58) Field of Classification Search
CPC .... B63G 8/00; B63G 8/001; B63G 2008/002; B63G 2008/004; B63G 2008/005;
(Continued)

(56) References Cited

U.S. PATENT DOCUMENTS 2,077,477 A * 4/1937 Hellman .................. B63G 8/40
125/23.01
4,922,848 A * 5/1990 Thiel ........................ B63G 8/40
239/271
(Continued)

FOREIGN PATENT DOCUMENTS

CN 106240766 A 12/2016
CN 107539440 A 1/2018
(Continued)

OTHER PUBLICATIONS

International Search Report of PCT/CN2022/104537, Mailed Jan. 18, 2023.

*Primary Examiner* — Daniel V Venne
(74) *Attorney, Agent, or Firm* — Daniel M. Cohn; Howard M. Cohn

(57) ABSTRACT

An underwater rescue device, including a cabin provided with a hatch is provided. The hatch is capable to open or close the cabin to form a confined space inside the cabin; a salvage device arranged inside the cabin, comprising a rescue platform and a gripper mechanism arranged on the rescue platform, wherein the rescue platform is movable, the rescue platform is capable to rotate relative to the cabin along at least one rotational axis and is capable to lift and lower to move out of the cabin, and the gripper mechanism is configured to grab a drowning person and fix the drowning person on the rescue platform; a cardiopulmonary resuscitation device arranged inside the cabin; a drainage device arranged on the cabin; and a power device arranged on an
(Continued)

outer side of the cabin. It has a high degree of automation and can provide immediate rescue for drowning personnel.

14 Claims, 12 Drawing Sheets

(51) Int. Cl.

*B60F 5/02* (2006.01)
*B63G 8/00* (2006.01)
*B63G 8/08* (2006.01)
*B63G 8/38* (2006.01)
*B63G 8/40* (2006.01)

(52) U.S. Cl.

CPC ............... *B63G 8/001* (2013.01); *B63G 8/08* (2013.01); *B63G 8/38* (2013.01); *B63G 8/40* (2013.01); *A61H 2201/0192* (2013.01); *A61H 2201/107* (2013.01); *A61H 2201/1215* (2013.01); *A61H 2201/14* (2013.01); *A61H 2201/1418* (2013.01); *A61H 2201/1664* (2013.01); *A61H 2201/1671* (2013.01); *A61H 2201/5092* (2013.01); *B63G 2008/002* (2013.01)

(58) Field of Classification Search

CPC ... B63G 8/08; B63G 8/14; B63G 8/16; B63G 8/22; B63G 8/24; B63G 8/38; B63G 8/40; B63G 8/41; B63C 9/00; B63C 9/01; B60F 5/00; B60F 5/003; B60F 5/02; A61H 31/006; A61H 31/008; A61H 2201/0192; A61H 2201/107; A61H 2201/0215; A61H 2201/14; A61H 2201/1418; A61H 2201/1664; A61H 2201/1671; A61H 2201/5092

USPC ........ 114/312, 313, 320, 321, 336, 337, 338

See application file for complete search history.

(56) References Cited

U.S. PATENT DOCUMENTS

| | | | |
|---|---|---|---|
| 5,597,335 A | 1/1997 | Woodland | |
| 2015/0307172 A1* | 10/2015 | Ng | B63C 9/0005 901/30 |

FOREIGN PATENT DOCUMENTS

| | | |
|---|---|---|
| CN | 207403890 U | 5/2018 |
| CN | 108945492 A | 12/2018 |
| CN | 108995782 A | 12/2018 |
| CN | 109094778 A | 12/2018 |
| CN | 110901860 A | 3/2020 |
| CN | 215752942 U | 2/2022 |
| CN | 114771180 A | 7/2022 |

* cited by examiner

UNDERWATER RESCUE DEVICE

CROSS-REFERENCE TO RELATED APPLICATIONS

This application is a continuation of International Patent Application No. PCT/CN2022/104537, filed on Jul. 8, 2022, which claims the benefit of priority from Chinese Patent Application No. 202210477312.6, filed on May 22, 2022. The contents of the aforementioned application, including any intervening amendments thereto, are incorporated herein by reference in its entirety.

TECHNICAL FIELD

The present disclosure relates to the field of water rescue technology, in particular to an underwater rescue device.

BACKGROUND

At present, underwater rescue equipment mainly consists of life jackets, lifebuoys, and lifelines. Rescue personnel need to rush to the location of the drowning accident, put the rescue equipment on the person, and then rescue the drowning person.

However, this rescue method requires rescue personnel to rush to the scene to carry out rescue operations, resulting in longer waiting times and lower rescue efficiency. At the same time, these rescue equipment can only be implemented smoothly under the guidance of professional lifeguards. Without the guidance of professional lifeguards, it is difficult for ordinary personnel to accurately implement lifesaving work.

SUMMARY

The objective of the present disclosure is to provide an underwater rescue device for the rescue of drowning personnel in water, with high rescue efficiency.

In order to achieve the above objective, the present disclosure adopts the following technical solution:

An underwater rescue device, including:

- a cabin provided with a hatch, wherein the hatch is capable to open or close the cabin to form a confined space inside the cabin;
- a salvage device arranged inside the cabin, including a rescue platform and a gripper mechanism arranged on the rescue platform, wherein the rescue platform is movable, the rescue platform is capable to rotate relative to the cabin along at least one rotational axis and is capable to lift and lower to move out of an interior of the cabin, and the gripper mechanism is configured to grab a drowning person and fix the drowning person on the rescue platform;
- a cardiopulmonary resuscitation device arranged inside the cabin, configured to conduct cardiopulmonary resuscitation to a drowning person on the rescue platform;
- a drainage device arranged on the cabin, configured to extract and discharge water inside the cabin; and
- a power device arranged on an outer side of the cabin, configured to drive the cabin to submerge or move on a water surface.

The present disclosure has the following advantages:

After the power device drives the cabin on the water surface or in the water to move near the drowning person, the hatch on the cabin opens, and the rescue platform moves out of the cabin. At the same time, the gripper mechanism grabs the drowning person and correctly places the drowning person on the rescue platform. After that, the cardiopulmonary resuscitation device performs cardiopulmonary resuscitation compression on the drowning person.

At the same time, the rescue platform is capable to rotate along at least one rotational axis, effectively improving its freedom of movement to facilitate the grasp of the drowning person. In addition, there is a drainage structure installed on the cabin, which allows the underwater rescue device to timely discharge the water inside the cabin, enabling it to float and navigate on the water surface. It also allows the water inside the cabin to be discharged in a timely manner, making it more convenient to perform cardiopulmonary resuscitation compression on the drowning person.

Wherein, the reference marks in accompanying drawings are as follows:

- 100. cabin; 110. hatch; 111. mounting post; 120. hatch driving mechanism; 121. linear module; 122. linkage component; 130. sliding slot;
- 200. salvage device; 210. rescue platform; 220. gripper mechanism; 221. gripping jaw; 222. gripping drive mechanism; 2221. gripper drive motor; 2222. first cam plate; 2223. slider; 2224. linkage mechanism; 230. lifting mechanism; 240. rotation base; 241. inner gear ring; 242. rotation drive motor; 2243. third bevel gear; 244. fourth bevel gear; 250. mechanical arm; 251. arm body; 252. first rotation mechanism; 2521. first drive motor; 253. second rotation mechanism; 2531. second drive motor; 2532. first bevel gear; 2533. second bevel gear; 254. telescopic rod; 255. assembly shaft; 260. first camera device;
- 300. cardiopulmonary resuscitation device; 310. three-axis driving mechanism; 320. compression device; 321. mounting bracket; 322. compression motor; 323. compression post; 324. second cam plate; 325. connecting rod assembly; 3251. first connecting rod; 3252. second connecting rod; 326. butting plate; 327. second camera device;

400. drainage device;

500. power device; 510. propulsion mechanism; 511. propeller device; 512. turning drive motor; 513. fifth bevel gear; 516. sixth bevel gear; 520. steering mechanism; 521. rudder; 522. steering drive mechanism; 5221. screw drive mechanism; 52211, screw rod; 52212. nut; 5222. connection assembly; 52221. swing rod; 52222. first rod; 52223, second rod;

600. gas supply device;

700. multi-rotor structure.

DETAILED DESCRIPTION OF THE EMBODIMENTS

The present disclosure will be further illustrated in detail below in conjunction with FIG. 1 to FIG. 13 and specific embodiments.

Figure 1:
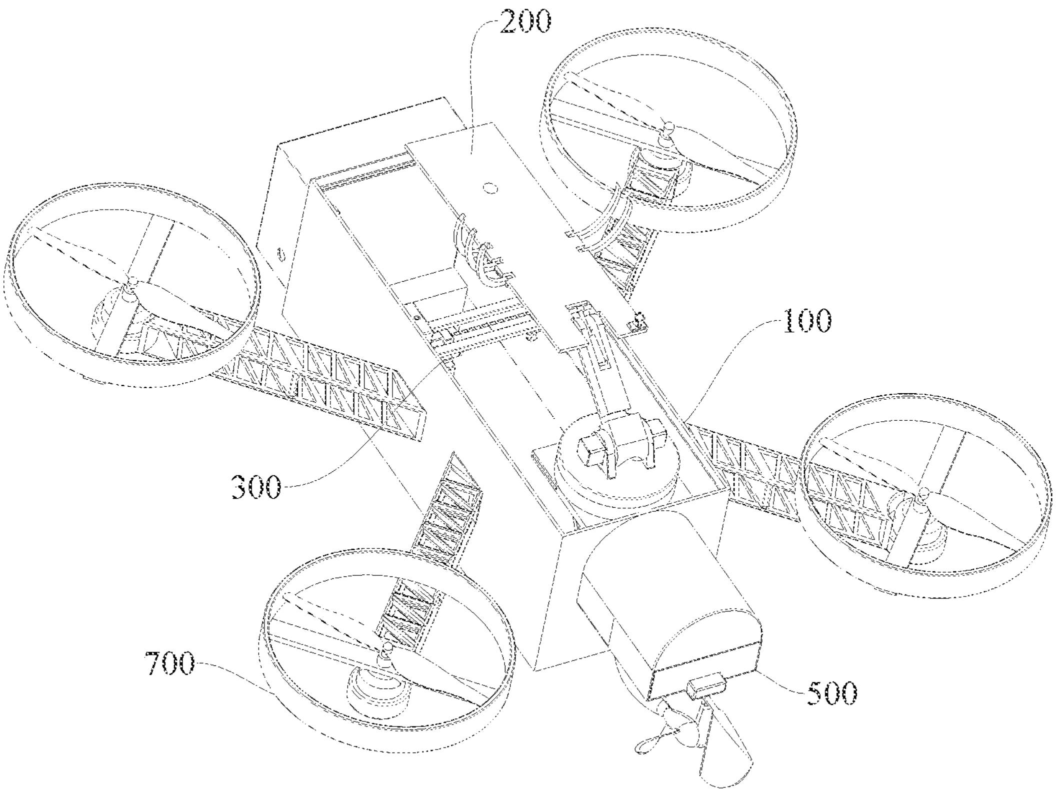
FIG. 1 is a three-dimensional view of the underwater rescue device in the embodiment of the present disclosure.
Figure 2:
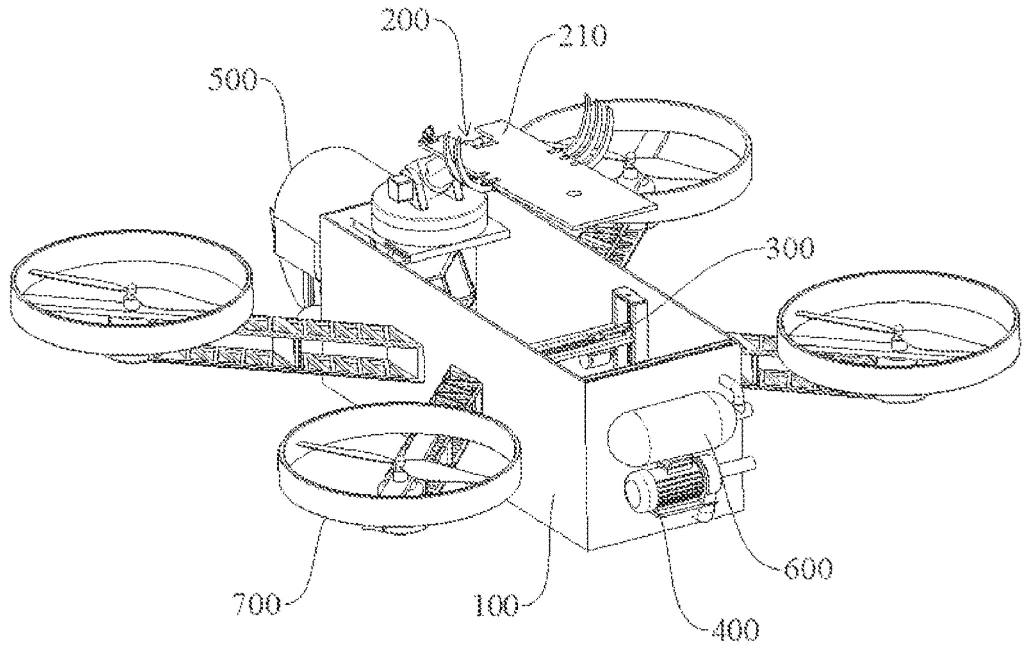
FIG. 2 is another three-dimensional view of the underwater rescue device in the embodiment of the present disclosure.

Referring to FIG. 1 and FIG. 2, the underwater rescue device of this application includes a cabin 100, a salvage device 200, a cardiopulmonary resuscitation device 320, a drainage device 400, and a power device 500.

Specifically, the power device 500 is provided in the cabin 100, which is configured to drive the cabin 100 to navigate or submerge on the water surface, in order to rescue drowning person in different positions and postures. For example, if the drowning person floats on the water surface, the power device 500 drives the cabin 100 to navigate on the water surface next to the drowning person, and then the salvage device 200 salvages and places the drowning person inside the cabin 100. If the drowning person sinks below the water surface, the power device 500 drives the cabin 100 to dive below the water surface, enabling the salvage device 200 to catch the drowning person.

The cabin 100 is equipped with a hatch 110. The hatch 110 can open or close the cabin 100, thereby forming a closed space inside the cabin 100. When the hatch 110 is opened, the drowning person can be placed inside the hatch 100 and transported by the water rescue device to the rescue center on shore. When the hatch 110 is closed, a closed and waterproof confined space is formed inside the cabin 100.

The drainage device 400 is arranged on the cabin 100 to suck and discharge the water inside the cabin 100 from the outside. The drainage device 400 can be a water pump.

Specifically, the power device 500 mentioned above drives the cabin 100 to dive below the water surface. The specific steps are as follows: the hatch 110 of the cabin 100 is opened to allow water to enter the interior of the cabin 100. As more and more water enters into the interior of the cabin 100, the buoyancy of the cabin 100 becomes less and less, and the cabin 100 gradually dives, at the same time, the power device 500 drives the cabin 100 to move below the water surface to approach the drowning person. The power device 500 pushes the cabin 100 to float, and the specific steps are as follows: that is, the hatch 110 closes the cabin 100 to form a waterproof confined space inside the cabin 100, the drainage device 400 starts to drain the water inside the cabin 100, and the buoyancy of the cabin 100 gradually increases to float.

The salvage device 200 is arranged inside the cabin 100, which includes a movable rescue platform 210 and a gripper mechanism 220 arranged on the rescue platform 210. The rescue platform 210 is capable to rotate relative to the cabin 100 along at least one rotational axis and can be lifted and lowered to move out of the interior of the cabin 100. The rescue platform 210 is capable to rotate along at least one rotational axis, so as to provide a greater degree of freedom of movement. When the position of the water rescue device remains unchanged in the water or on the surface, the rescue platform 210 has better rescue flexibility and is capable to quickly complete the positioning before grasping. The gripper mechanism 220 is configured to grab and fix the drowning person on the rescue platform 210.

Specifically, when rescuing a drowning person, the rescue platform 210 moves out of the cabin 100 while rotating relative to the cabin 100 along at least one rotational axis to adjust the rescue direction, that is, to a position where the drowning person can be fully placed on the rescue platform 210, thereby facilitating the gripper mechanism 220 to grasp the drowning person. The gripper mechanism 220 is configured for grasping a drowning person. Specifically, when the rescue platform 210 is moved to the side of the drowning person, the gripper mechanism 220 grabs and fixes the drowning person on the rescue platform 210. After the gripper mechanism 220 fixes the drowning person on the rescue platform 210, the rescue platform 210 carries the drowning person back to the interior of the cabin 100.

The cardiopulmonary resuscitation device 320 is provided inside the cabin 100 and is configured to perform cardiopulmonary compression on the drowning person fixed on the rescue platform 210. Specifically, in the steps described above, the rescue platform 210 carries the drowning person back into the cabin 100 and resets, and the cardiopulmonary resuscitation device 320 compresses the drowning person, so that the drowning person timely spit out the water that has choked into the body.

By setting up the underwater rescue device in this way, it can dive into the water or navigate on the surface. At the same time, the rescue platform 210 has more freedom of movement and has more rescue positions for drowning people, which can timely and effectively carry out automatic rescue for drowning people. At the same time, the cardiopulmonary resuscitation device 320 inside the cabin 100 can also perform cardiopulmonary resuscitation compression for drowning people in the first time, thereby effectively improving rescue efficiency.

Figure 3:
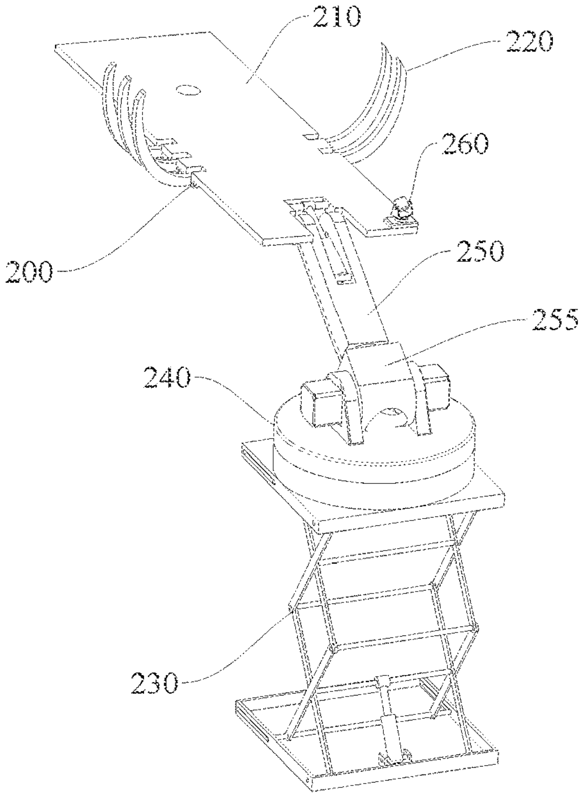
FIG. 3 is a three-dimensional view of the salvage device in the embodiment of the present disclosure.
Figure 4:
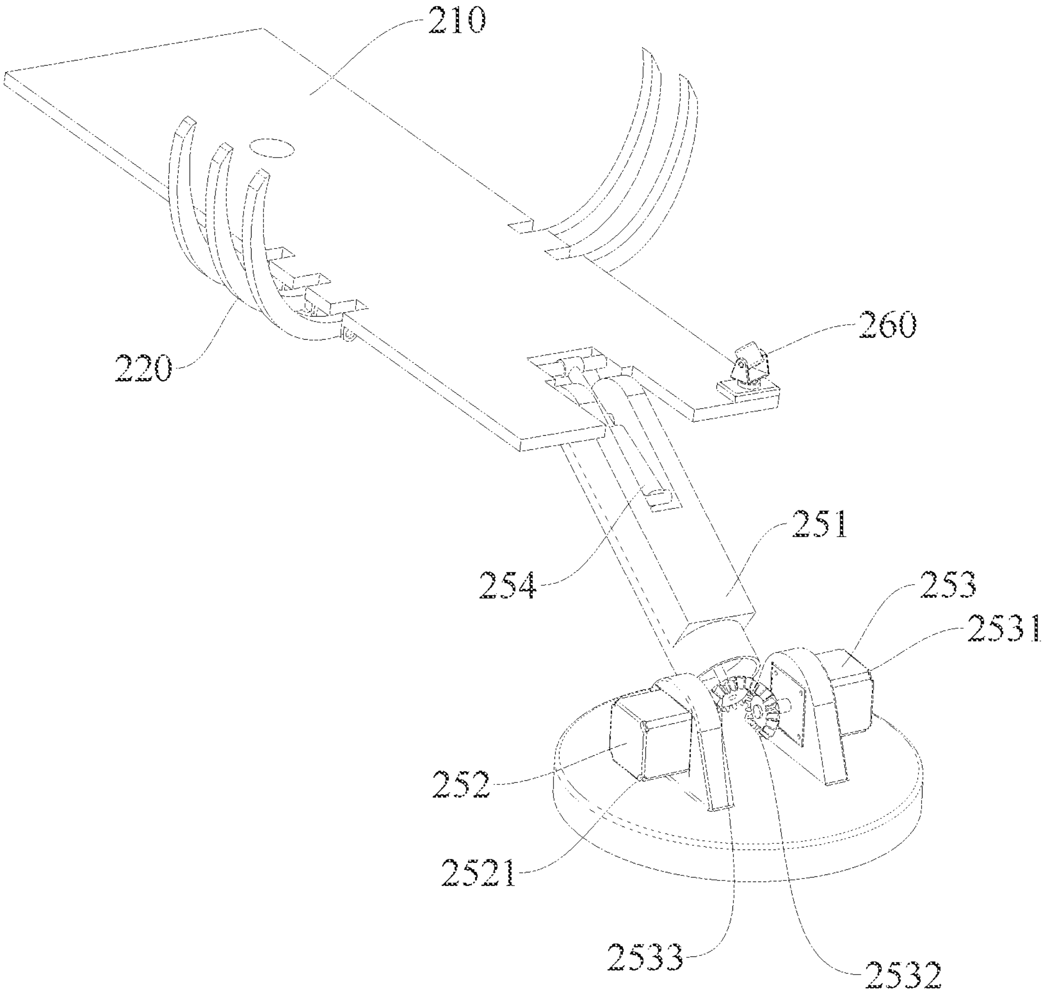
FIG. 4 is a three-dimensional view of the partial structure of the salvage device in the embodiment of the present disclosure.
Figure 5:
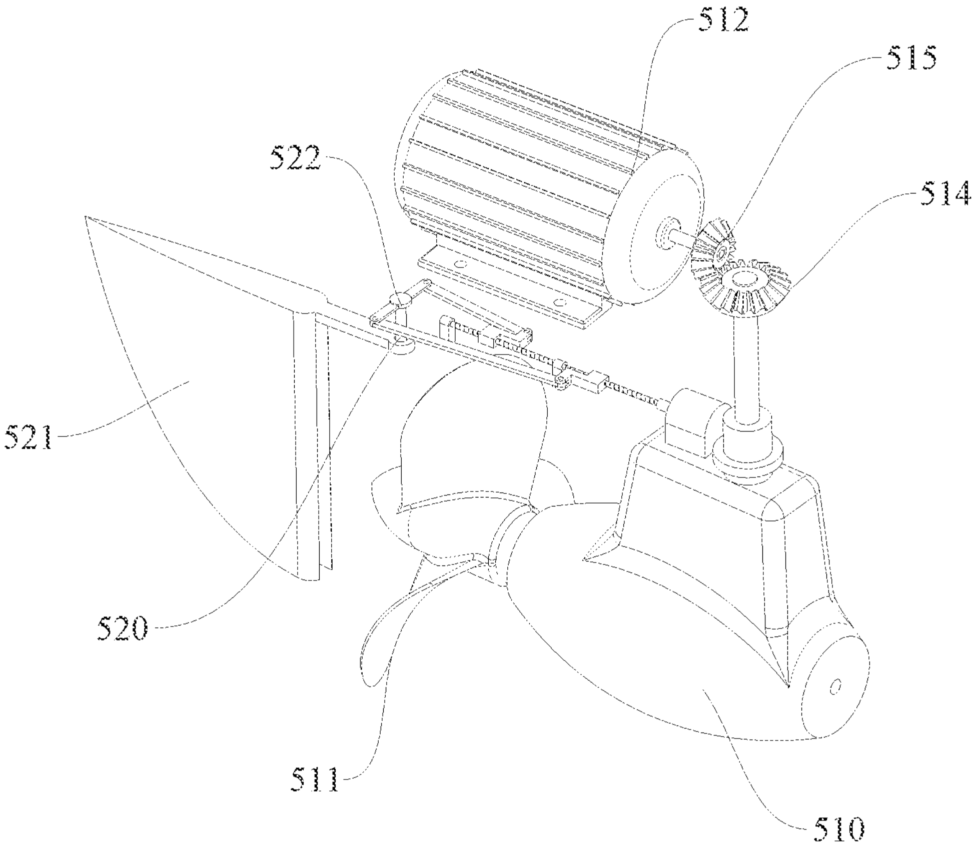
FIG. 5 is a schematic diagram showing of the grasping structure in the embodiment of the present disclosure.

Referring to FIG. 3 to FIG. 5, in some embodiments, specifically, the salvage device 200 also includes a lifting mechanism 230 arranged inside the cabin 100, a rotation base 240 arranged on the lifting mechanism 230, and a mechanical arm 250 connecting the rotation base 240 and the rescue platform 210. The lifting mechanism 230 is configured to drive the rotation base 240 to up and down, so as to move out of the cabin 100, thereby providing more space for the rescue platform 210 to move, The rotation base 240 is configured to drive the rescue platform 210 to rotate along the first axis, and the mechanical arm 250 is configured to drive the rescue platform 210 to move out of the cabin 100, for example, by lifting the rescue platform 210 to move it out of the cabin 100. In one embodiment, please see FIG. 3, that the lifting mechanism 230 includes a double scissor type truss structure that expands and contracts to lift and lower the rotation base 240 via a piston connected to the bottom of such structure.

Figure 6:
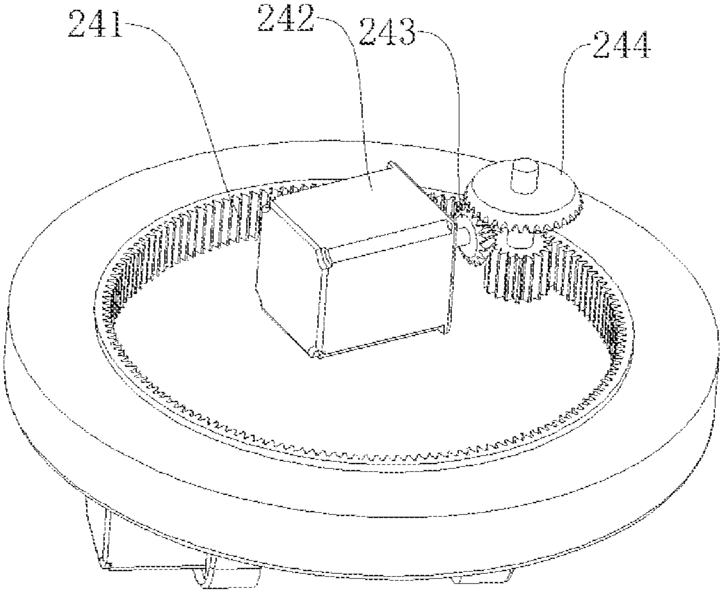
FIG. 6 is a schematic diagram of the rotation platform in the embodiment of the present disclosure.

Referring to FIG. 6, in some embodiments, the rotation base 240 may be configured as follows: an inner gear ring 241 rotatably provided inside the cabin 100, wherein the inner gear ring 241 is connected to the mechanical arm 250; a rotation drive motor 242 is arranged inside the cabin 100; a third bevel gear 243 is arranged on the output shaft of the rotation drive motor 242; and a gear set is also arranged inside the cabin 100, between the rotation drive motor 242 and the internal gear ring 241. The gear set includes a fourth bevel gear 244 that is meshed with the third bevel gear 243, and a gear that is fixedly arranged and coaxially with the fourth bevel gear 244 and meshed with the inner gear ring 241, thereby achieving the drive of the rotation drive motor 242 to the inner gear ring 241.

Specifically, in this embodiment, when rescuing a drowning person, the lifting mechanism 230 raises the rotating platform to raise its height above the opening of the cabin 100, and the rotation base 240 also rotates synchronously, so that the rescue platform 210 can change its position relative to the cabin 100. Then, the mechanical arm 250 drives the rescue platform 210 to move to the rescue position to more conveniently grasp the drowning person. There is no need for the power device 500 to push the cabin 100 for fine adjustment of the rescue position.

Referring to FIG. 3 and FIG. 4, in further embodiments, the mechanical arm 250 includes an arm body 251, a first rotation mechanism 252 and a second rotation mechanism 253 simultaneously located at the same end of the arm body 251. The first rotation mechanism 252 is configured to drive the arm body 251 to rotate along the second axis, and the second rotation mechanism 253 is configured to drive the arm body 251 to rotate along the third axis. Wherein, the first axis, the second axis, and the third axis are perpendicular to each other, the first axis is parallel to the height direction of the rotating platform, the second axis is perpendicular to the length direction of the arm body 251, and the third axis is parallel to the length direction of the arm body 251.

Specifically, an assembly shaft 255 is rotationally arranged at one end of the arm body 251. The assembly shaft 255 is fixedly connected to the driving end of the first rotation mechanism 252, and the second rotation mechanism 253 is arranged inside the assembly shaft 255 and its driving end is connected to the arm body 251.

By setting the first rotation mechanism 252 and the second rotation mechanism 253, the mechanical arm 250 can perform multi-axis rotation, that is, the rescue platform 210 can perform multi-axis rotation, such as 180° rotation, so that the rescue platform 210 can rescue drowning person in different postures. For example, if the drowning person's posture in the water is facing upwards, the rescue platform 210 does not need to rotate relative to the horizontal plane after moving out of the cabin 100. It only needs to move directly below the drowning person under the driving force of the rotating platform and mechanical arm 250. If the drowning person's posture in the water is facing downwards, the rescue platform 210 will be lifted out of the cabin 100, flipped 180° relative to the horizontal plane, and moved directly above the drowning person, then the gripper mechanism 220 grasps the drowning person, making the back of the drowning person fit with the front of the rescue platform 210. After flipping 180° relative to the horizontal plane and resetting, the rescue platform 210 will be driven by the rotating platform and mechanical arm 250 to return to the interior of the cabin 100.

It can be understood that in some embodiments, the first rotation mechanism 252 is a first drive motor 2521. The second rotation mechanism 253 includes a second drive motor 2531, a first bevel gear 2532 arranged on the output shaft of the second drive motor 2531, and a second bevel gear 2533 arranged on the arm body 251 and meshed with the first bevel gear 2532. Wherein the output shaft of the first drive motor 2521 is fixedly connected to the assembly shaft 255, and the second drive motor 2531 is fixedly arranged inside the assembly shaft 255.

It can be understood that the arm body 251 can be set in multiple ways. For example, the arm body 251 may be a telescopic arm, and the arm body 251 may also be set as the following implementation method. Specifically, one end of the arm body 251 is hinged with the rescue platform 210, and the end of the arm body 251 near the rescue platform 210 is hinged with a telescopic rod 254. The other end of telescopic rod 254 is hinged with the rescue platform 210, and the telescopic rod 254 is used to push the rescue platform 210 to rotate relative to arm body 251.

In this way, when the first rotation mechanism 252 drives the arm body 251 to rotate, the telescopic rod 254 can synchronously push the rescue platform 210 to rotate, so that the rescue platform 210 can remain horizontal during the process of being moved out or stored in the cabin 100, in order to prevent the occurrence of overturning due to unstable center of gravity during the recovery of the drowning person to the cabin 100.

Referring to FIG. 3 to FIG. 5, in some embodiments, the gripper mechanism 220 includes a plurality of grippers 221 hinged on both sides of the rescue platform 210, and a gripping drive mechanism 222 located on the back of the rescue platform 210. The gripping drive mechanism 222 is used to drive each gripper 221 to open or close synchronously.

Specifically, the gripping drive mechanism 222 includes a gripper drive motor 2221, a first cam plate 2222, a slider 2223, and two linkage mechanisms 2224. The first cam plate 2222 is arranged on the output shaft of the gripper drive motor 2221, and the slider 2223 is slidably arranged on the rescue platform 210. The slider 2223 is connected to the first cam plate 2222 through a connecting piece 2225. When the first cam plate 2222 rotates, the slider 2223 is pushed to move in a linear reciprocating motion. Each linkage mechanism 2224 is separately connected to the slider 2223 and the gripping jaws 221. When the slider 2223 moves in a linear reciprocating motion, each gripper jaw 221 synchronously opens or closes.

Specifically, the gripper jaws 221 located on the same side of the rescue platform 210 are fixedly connected through the same shaft, and the linkage mechanism 2224 is fixedly connected to the gripper jaws 221 through shafts, thereby achieving synchronous driving of each gripper 221 by the linkage mechanism 2224.

Referring to FIG. 3 and FIG. 4, it can be understood that on the basis of the aforementioned embodiments, a first camera device 260 is also arranged on the rescue platform 210. The first camera device 260 is used to capture the position and posture of the rescue platform 210, in order to more accurately determine the spatial position relationship between the rescue platform 210 and the drowning person, thereby achieving more efficient rescue operations.

Figure 11:
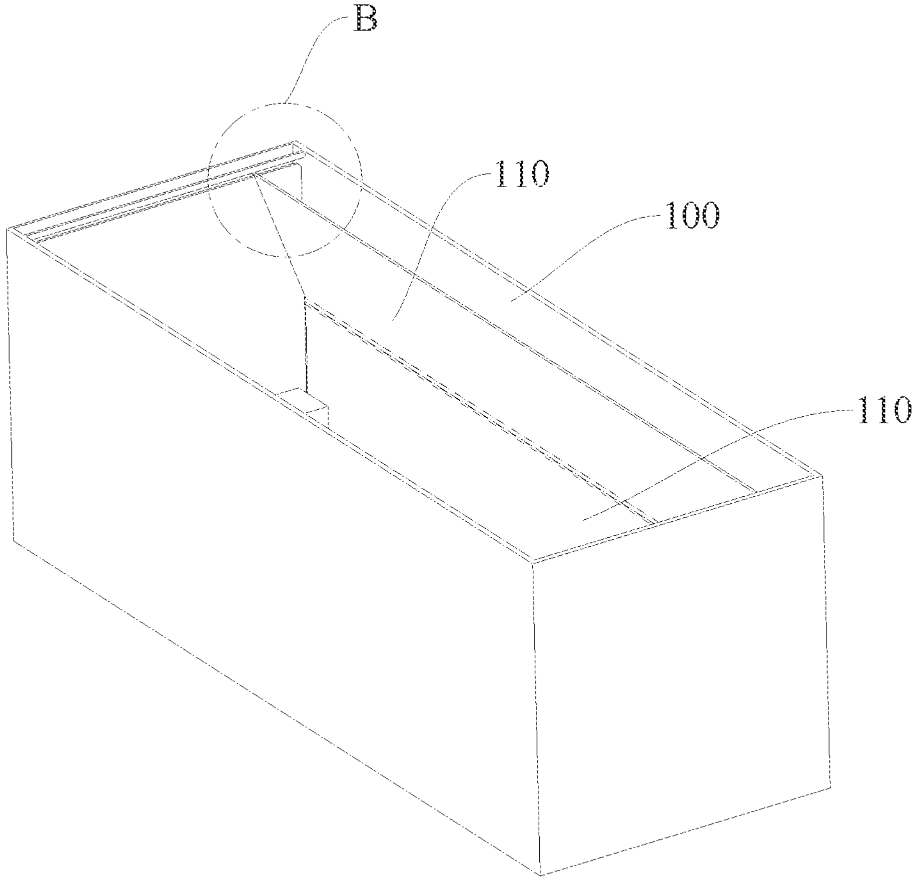
FIG. 11 is a three-dimensional view of the cabin in the embodiment of the present disclosure.
Figure 12:
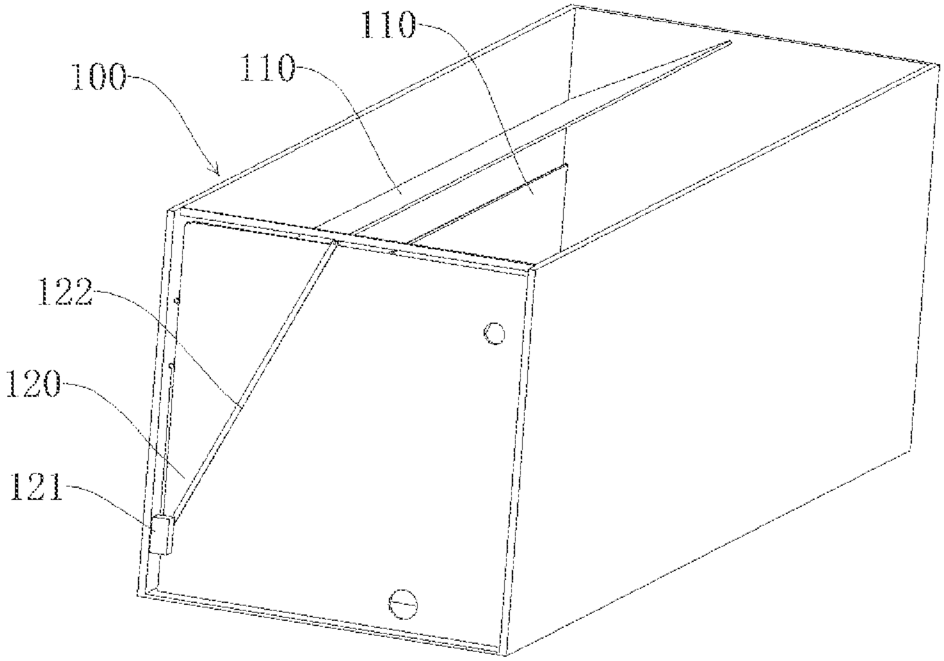
FIG. 12 is a three-dimensional view showing of the installation structure of the hatch in the embodiment of the present disclosure.
Figure 13:
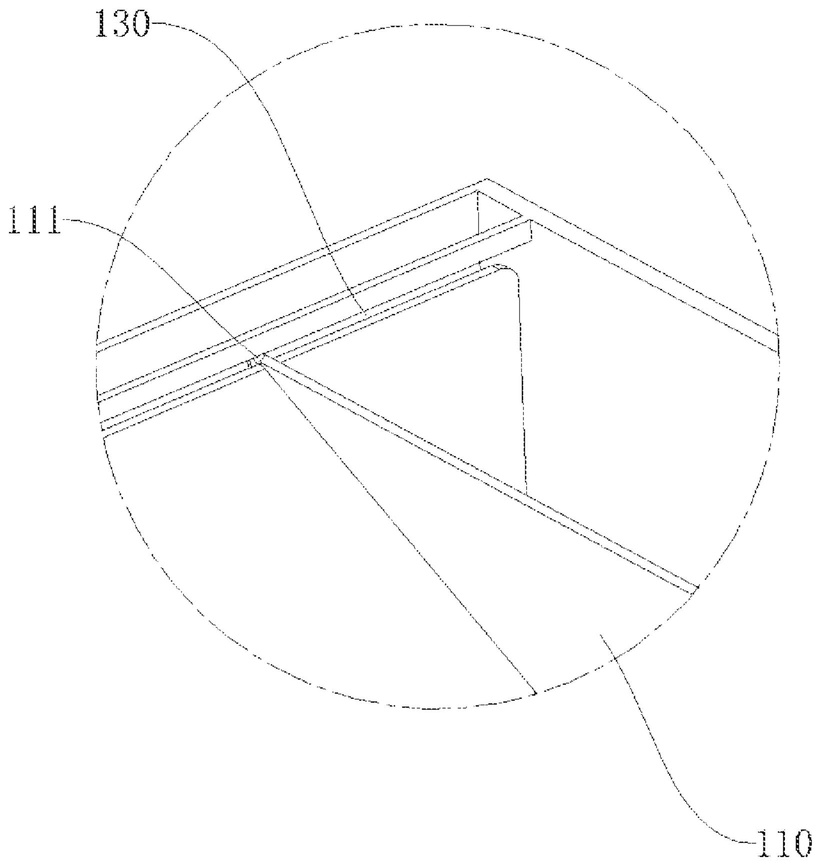
FIG. 13 is an enlarged view of portion B in FIG. 11.

Referring to FIG. 11 to FIG. 13, in some embodiments, at least one hatch 110 is slidably provided on the cabin 100. On one side of the interior of the cabin 100, referring to FIG. 11 to FIG. 13, there is a hatch driving mechanism 120, which is used to drive the sliding of the hatch 110 to open or close the cabin 100.

Referring to FIG. 11 to FIG. 13, in specific embodiments, there provides two hatches 110 in sliding manner, namely the first hatch 110 and the second hatch 110. There are sliding slots 130 provided inside the cabin 100, the sliding slots 130 are located on the same side of the top and side of the cabin 100, and the sliding slots 130 located on the same side of the top and side of the cabin 100 are connected. Both sides of each hatch 110 are sliding clamped to the sliding slots 130 through mounting posts 111. When the mounting post 111 slides from the sliding slot 130 at the top to the sliding slot 130 at the side, the hatch 110 opens and is stored on one side inside the cabin 100.

The hatch driving mechanism 120 includes a linear module 121 and a linkage component 122, wherein the linkage component 122 may be a rod, and the linear module 121 is capable to move in a straight line along the height direction of the cabin 100. The linear module 121 is hinged with the mounting post 111 of the first hatch 110, one end of the linkage component 122 is hinged with the linear module 121, and the other end is hinged with the mounting post 111 of the second hatch 110. In this setting, when the linear module 121 moves along the height direction of the cabin 100 to pull the first hatch 110 open and store it on one side of the interior of the cabin 100, the second hatch 110 synchronously opens under the pull of the linkage component 122. When the linear module 121 moves to the extreme position, the second hatch 110 is also stored on one side of the interior of the cabin 100.

By setting the hatch 110 and the hatch driving mechanism 120 in this way, the synchronization of the movement of the two hatches 110 is good.

Figure 9:
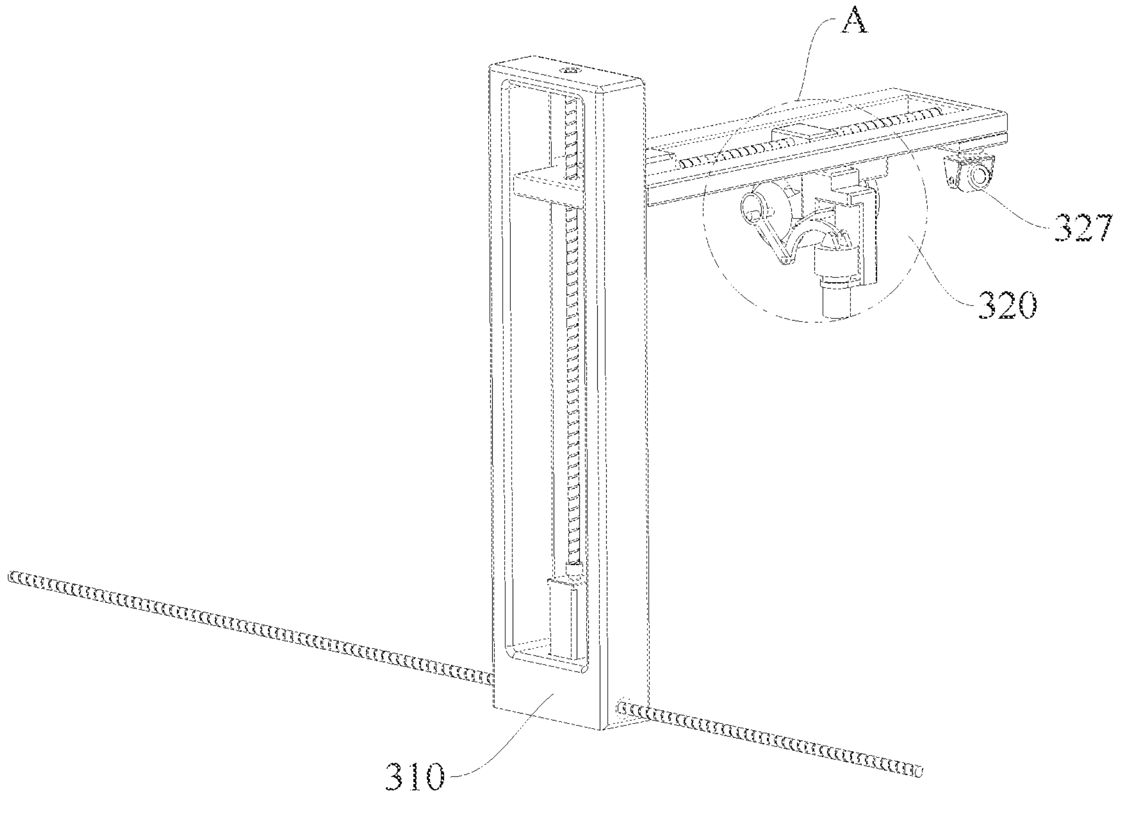
FIG. 9 is a three-dimensional view of the cardiopulmonary resuscitation device in the embodiment of the present disclosure.
Figure 10:
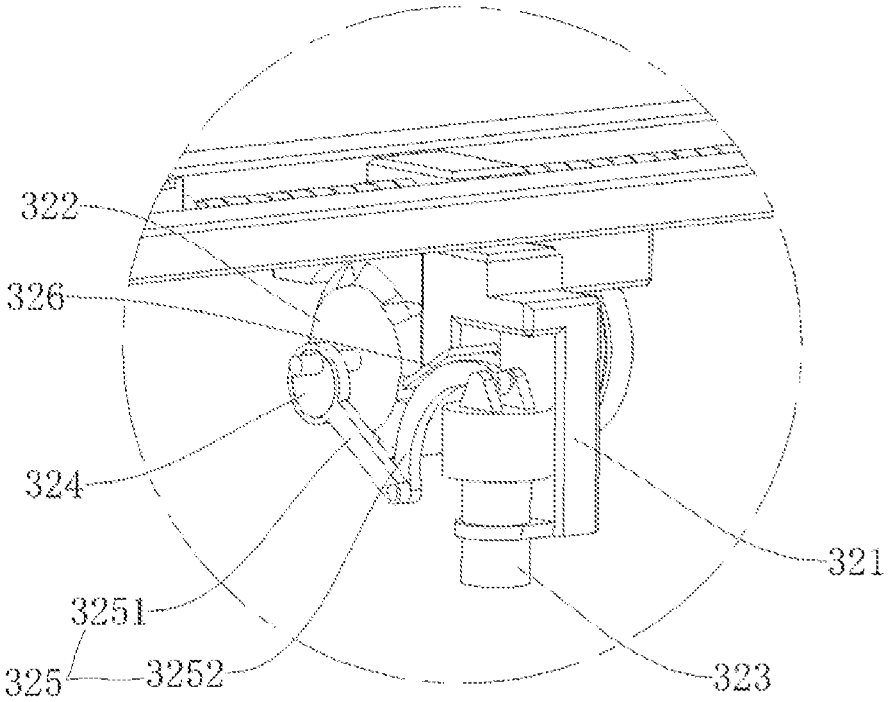
FIG. 10 is an enlarged view of portion A in FIG. 9.

Referring to FIG. 9 and FIG. 10, in some embodiments, the cardiopulmonary resuscitation device 320 includes a three-axis driving mechanism 310 and a compression device 320 arranged inside the cabin 100. The three-axis driving mechanism 310 is used to drive the compression device 320 to move, in order to accurately perform cardiopulmonary resuscitation compression on a drowning person.

The cardiopulmonary resuscitation device 320 is driven by the three-axis driving mechanism 310. Under the driving of the compression device 320, the cardiopulmonary resuscitation device 320 are driven to perform three-axis movement, so as to obtain a greater freedom of movement. When the drowning person is fixed on the rescue platform 210, even if there is a slight deviation in the fixed position of the drowning person, the cardiopulmonary resuscitation device 320 can still move to the optimal position for cardiopulmonary resuscitation (CPR) compression to press the drowning person, provide immediate rescue to the drowning person to improve rescue efficiency.

Specifically, the cardiopulmonary resuscitation device 320 includes a mounting bracket 321 arranged on the three-axis driving mechanism 310, a compression motor 322 arranged on the mounting bracket 321, and a compression post 323 sliding vertically on the mounting bracket 321. The output shaft of the compression motor 322 is provided with a second cam plate 324, and the second cam plate 324 is connected to the compression post 323 through a connecting rod assembly 325. When the compression motor 322 rotates, the compression motor 322 drives the second cam plate 324 to rotate, causing the second cam plate 324 to drive the connecting rod assembly 325 to swing, thereby driving the compression post 323 to move back and forth in a straight line to achieve cardiopulmonary resuscitation compression.

More specifically, the connecting rod assembly 325 includes a first connecting rod 3251 and a second connecting rod 3252. The two ends of the first connecting rod 3251 are respectively connected to the second cam plate 324 and the second connecting rod 3252, and the two ends of the second connecting rod 3252 are respectively hinged with the first connecting rod 3251 and the compression post 323. The second connecting rod 3252 is an arc-shaped connecting rod, a butting plate 326 is installed on the mounting bracket 321, and The second connecting rod 3252 always contacts the butting plate 326. Due to the fact that the first connecting rod 3251 is a straight rod, when the second cam plate 324 rotates, the second cam plate 324 drives the first connecting rod 3251 to swing, causing the first connecting rod 3251 to drive the second connecting rod 3252 to swing. Additionally, due to the fact that the second connecting rod 3252 is an arc-shaped connecting rod and contacts the butting plate 326, when the second connecting rod 3252 swings, under the limitation of the butting plate 326, the second connecting rod 3252 and the hinged end of the compression post 323 move back and forth in a straight line, so as to drive the compression post 323 to perform reciprocating linear motion.

Referring to FIG. 9, it can be understood that in each embodiment of the compression device 320, the compression device 320 also includes a second camera device 327 configured to capture the specific position of the compression device 320, so that the three-axis driving mechanism 310 accurately drives the compression device 320 to the compression position to effectively perform cardiopulmonary resuscitation compression on the drowning person. In some specific embodiments, the second camera device 327 is provided on the mounting bracket 321.

Figure 7:
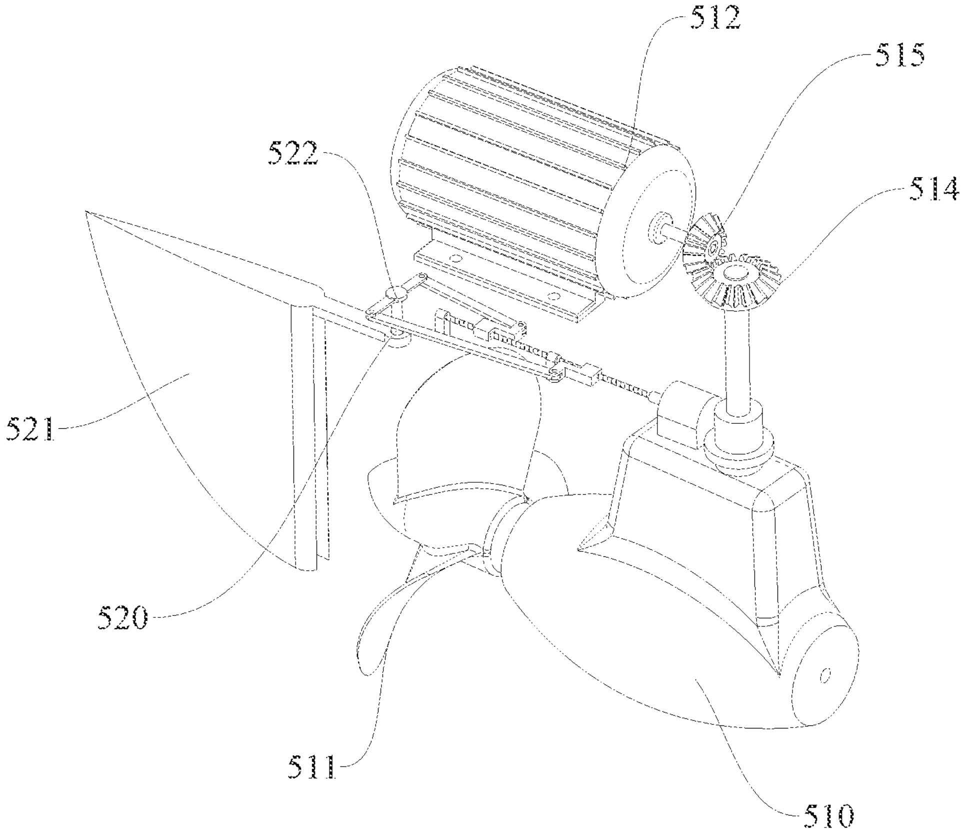
FIG. 7 is a three-dimensional view of the power device in the embodiment of the present disclosure.
Figure 8:
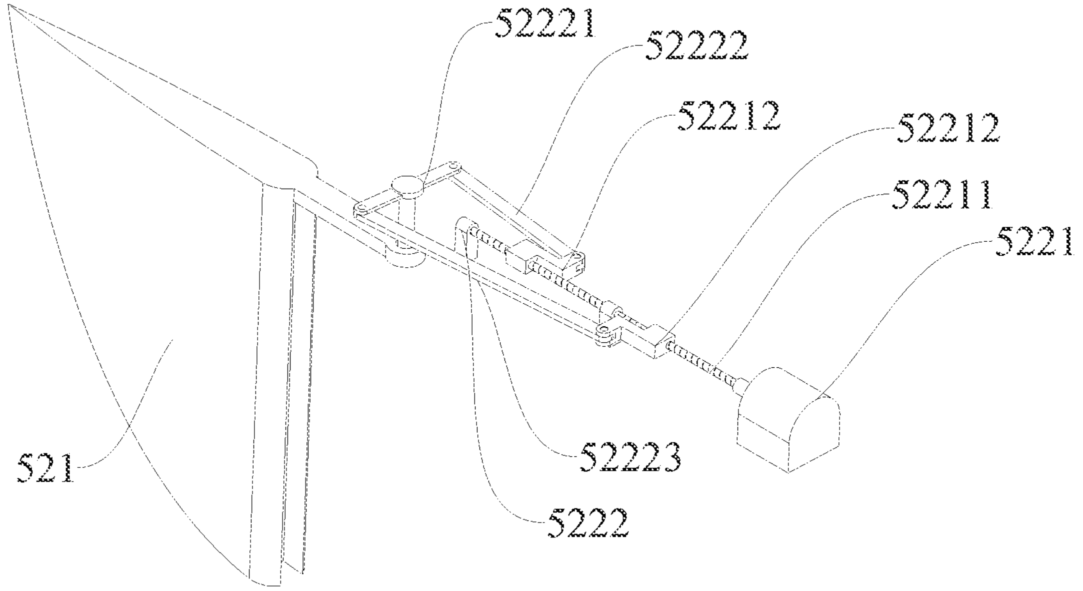
FIG. 8 is a three-dimensional view showing of the structure in FIG. 7 after the propulsion mechanism is hidden.

Referring to FIG. 7 and FIG. 8, in some embodiments, the power device 500 includes a propulsion mechanism 510 and a steering mechanism 520. The propulsion mechanism 510 includes a propeller device 511, and the steering mechanism 520 includes a rudder surface 521 and a steering drive mechanism 522 connected to the rudder surface 521.

Specifically, the steering drive mechanism 522 includes a screw drive mechanism 5221 and a connection assembly 5222. Two nuts 52212 with opposite movement directions are arranged on the screw rod 52211 of the screw drive mechanism 5221, that is, the first nut 52212 and the second nut 52212. The connecting assembly 5222 includes a swing rod 52221, a first rod 52222 and a second rod 52223. The middle of the swing rod 52221 is fixedly connected with the rudder surface 521. One end of the first rod 52222 is hinged with one end of the swing rod 52221, the other end of the first rod 52222 is hinged with the first nut 52212, one end of the second rod 52223 is hinged with the other end of the swing rod 52221, and the other end of the second rod 52223 is hinged with the second nut 52212. When the screw drive motor drives the screw rod 52211 to rotate, the first nut 52212 and the second nut 52212 synchronously rotate in the opposite direction. Additionally, due to the fixed connection between the middle of the swing rod 52221 and the rudder surface 521, the first nut 52212 and the second nut 52212 synchronously pull the swing rod 52221 to swing, thereby achieving the swing of the rudder surface 521. In this way, the swing driving force of the rudder surface 521 is large and stable.

Referring to FIG. 7, in some embodiments, the propeller device 511 is rotatably arranged on the cabin 100 and is capable to swing along left-right direction. In this way, the propeller can swing left and right to cooperate with the rudder surface 521, effectively improving the turning efficiency of the cabin 100 in water.

Specifically, a turning drive motor 512 is arranged on the cabin 100, and a fifth bevel gear 513 is arranged on the output shaft of the turning drive motor 512. A rotating shaft is arranged on the shell of the propeller, and a sixth bevel gear 514 meshing with the fifth bevel gear 513 is arranged on the rotating shaft to enable the turning drive motor 512 to drive the propeller to swing.

Referring to FIG. 2, in some embodiments, the underwater rescue device also includes a gas supply device 600 arranged in the cabin 100, which is used to provide oxygen to the confined space cabin 100. In this way, when the cabin 100 in the water has not yet surfaced, the cabin 100 can be synchronously supplied with oxygen by the gas supply device 600 during the drainage process, in order to prevent the drowning person from suffocating in the cabin 100.

Referring to FIG. 1 and FIG. 2, in some embodiments, the underwater rescue device further includes a multi-rotor structure 700 on the outer side of the cabin 100, which is used to drive the underwater rescue device for flight. For example, the multi-rotor structure 700 may be a quadrotor, a six-rotor, and the like. When the cabin 100 rises to the surface and the drainage is completed, the multi-rotor structure 700 is capable to drive the underwater rescue device to fly to reach the rescue point on land as soon as possible, thereby improving rescue efficiency.

What is claimed is:

1. An underwater rescue device, comprising:
- a cabin provided with a hatch, wherein the hatch is capable to open or close the cabin to form a confined space inside the cabin;
- a salvage device arranged inside the cabin, comprising a rescue platform and a gripper mechanism arranged on the rescue platform, wherein the rescue platform is movable, the rescue platform is capable to rotate relative to the cabin along at least one rotational axis and is capable to lift and lower to move out of an interior of the cabin, and the gripper mechanism is configured to grab a drowning person and fix the drowning person on the rescue platform;
- a cardiopulmonary resuscitation device arranged inside the cabin, configured to conduct cardiopulmonary resuscitation to the drowning person on the rescue platform;
- a drainage device arranged on the cabin, configured to extract and discharge water inside the cabin; and
- a power device arranged on an outer side of the cabin, configured to drive the cabin to submerge or move on a water surface.

2. The underwater rescue device according to claim 1, wherein the gripper mechanism comprises a plurality of gripping jaws hinged on both sides of the rescue platform, a gripping drive mechanism located on a back of the rescue platform, and the gripping drive mechanism is configured to drive each of the plurality of gripping jaws to open or close.

3. The underwater rescue device according to claim 2, wherein the gripping drive mechanism comprises a gripper drive motor, a first cam plate, a slider, and a linkage mechanism; the first cam plate is arranged on an output shaft of the gripper drive motor, the slider is slidably arranged on the rescue platform, the slider is connected to the first cam plate through a connecting piece, the first cam plate is configured to push the slider for linear reciprocating motion, the linkage mechanism is respectively connected to the slider and the plurality of gripping jaws, and each of the plurality of gripping jaws synchronously opens or closes when the slider moves in a linear reciprocating motion.

4. The underwater rescue device according to claim 1, wherein a first camera device is arranged on a front of the rescue platform.

5. The underwater rescue device according to claim 1, wherein at least one of the hatch is slidably provided on the cabin body, a hatch driving mechanism is arranged on one side of the interior of the cabin, and the hatch driving mechanism is configured to drive the hatch to slide to open or close the cabin.

6. The underwater rescue device according to claim 5, wherein the hatchs slidably provided, sliding slots are provided inside the cabin, both sides of the hatch are sliding and clamped to the sliding slots through mounting posts; the hatch driving mechanism comprises a linear module and a linkage component, the linear module is hinged with the mounting posts of one of the hatchs, one end of the linkage component is hinged with the linear module, and an other end is hinged with the mounting posts of the other hatch.

7. The underwater rescue device according to claim 1, wherein the cardiopulmonary resuscitation device comprises a three-axis driving mechanism and a compression device arranged inside the cabin; and the three-axis driving mechanism is configured to drive the compression device to move, so as to accurately perform cardiopulmonary resuscitation compression on the drowning person.

8. The underwater rescue device according to claim 7, wherein the compression device comprises a mounting bracket arranged on the three-axis driving mechanism, a compression motor arranged on the mounting bracket, and a compression post vertically sliding on the mounting bracket; an output shaft of the compression motor is provided with a second cam plate, and the second cam plate is connected to the compression post through a connecting rod assembly.

9. The underwater rescue device according to claim 8, wherein the connecting rod assembly comprises a first connecting rod and a second connecting rod, wherein two ends of the first connecting rod are respectively connected to the second cam plate and the second connecting rod, and two ends of the second connecting rod are respectively hinged with the first connecting rod and the compression post, the second connecting rod is an arc-shaped connecting rod, a butting plate is arranged on the mounting bracket, and the second connecting rod is always in contact with the butting plate.

10. The underwater rescue device according to claim 7, wherein a second camera device is provided on the compression device.

11. The underwater rescue device according to claim 1, wherein the power device comprises a propulsion mechanism and a steering mechanism; the propulsion mechanism comprises a propeller device; the steering mechanism comprises a rudder surface and a steering drive mechanism connected to the rudder surface; the steering drive mechanism comprises a screw drive mechanism and a connection assembly; a screw rod of the screw drive mechanism is provided with two nuts with opposite moving directions; the connection assembly comprises a swing rod, a first rod and a second rod; a middle of the swing rod is fixedly connected with the rudder surface, one end of the first rod is hinged with one end of the swing rod, an other end of the first rod is hinged with one of the nuts, one end of the second rod piece is hinged with an other end of the swing rod, and an other end of the second rod piece is hinged with the other one of the nuts.

12. The underwater rescue device according to claim 11, wherein the propeller device rotatably arranged on the cabin, and the propeller device is capable to swing along a left-right direction.

13. The underwater rescue device according to claim 1, wherein a gas supply device is provided in the cabin, and the gas supply device is configured to supply oxygen to the confined space of the cabin.

14. The underwater rescue device according to claim 1, wherein a multi-rotor structure is provided on the outer side of the cabin, and the multi-rotor structure is configured to drive the underwater rescue device to flight.

* * * * *